United States Patent [19]

Hogh et al.

[11] Patent Number: 4,702,790
[45] Date of Patent: Oct. 27, 1987

[54] FUEL FILTER APPARATUS AND THE METHOD OF MANUFACTURE

[75] Inventors: Josef Hogh, Waiblingen; Hans Schacht, Stuttgart, Fed. Rep. of Germany

[73] Assignee: Robert Bosch GmbH, Stuttgart, Fed. Rep. of Germany

[21] Appl. No.: 734,387

[22] Filed: May 14, 1985

[30] Foreign Application Priority Data

Jul. 10, 1984 [DE] Fed. Rep. of Germany ....... 3425347

[51] Int. Cl.$^4$ ............................................. B01D 27/04
[52] U.S. Cl. .................... 156/293; 156/295; 210/232; 210/497.1; 210/454
[58] Field of Search .......... 210/232, 443, 450, 497.01, 210/497.1, 454, 493.2, DIG. 17; 55/500, 502, 510, 520, 524, DIG. 5; 210/493.4; 264/D48; 156/293, 295

[56] References Cited

U.S. PATENT DOCUMENTS

| | | | |
|---|---|---|---|
| 3,782,083 | 1/1974 | Rosenberg | 55/502 |
| 4,021,342 | 5/1977 | Schacht et al. | 210/232 |
| 4,056,876 | 11/1977 | Lämmermann | 156/293 |
| 4,148,732 | 4/1979 | Burrow et al. | 210/232 |
| 4,163,721 | 8/1979 | Lobdell | 210/232 |
| 4,219,426 | 8/1980 | Spekle et al. | 210/232 |
| 4,310,419 | 1/1982 | Nara et al. | 210/493.4 |
| 4,414,110 | 11/1983 | Geel et al. | 210/450 |

FOREIGN PATENT DOCUMENTS 2547857  5/1977  Fed. Rep. of Germany .

Primary Examiner—Richard V. Fisher
Assistant Examiner—Wanda L. Millard
Attorney, Agent, or Firm—Michael J. Striker

[57] ABSTRACT

A fuel filter includes a housing made of plastics and having a main housing portion accommodating a filter element, and a cover. The housing portions are tightly connected to each other at a single ring-shaped glue spot. The housing portion is formed with a pocket filled with glue and the cover is formed with a collar partially projecting into the pocket to form an annular Z-shaped gap in which the glue is distributed. When the glue is solidified the housing and the cover become rigidly and tightly connected to each other. The shape of the gap protects the glue against aggressive fuel.

5 Claims, 2 Drawing Figures

4,702,790

FUEL FILTER APPARATUS AND THE METHOD OF MANUFACTURE

BACKGROUND OF THE INVENTION

The present invention relates to a filter for refining fluids, particularly fuels or oils.

Known filters of the foregoing type, one of which is disclosed in DE-OS No. 2,547,857, include a housing in which a wound filter element is accommodated, the housing being comprised of a cup-shaped main portion and a housing cover. Both housing portions, which are separated from each other to form a contaminated side and a filtered or clean side, are connected to each other and to the filter element inserted in the housing at a single ring-shaped glue location.

An additional anchoring is provided by flanging of the edge of the main housing portion. The disadvantage of such a filter resides in that only housing portions of metal and a hot melting adhesive or glue could be used with the single glue location or spot. However, hot melting glue can not be utilized with the housing made of plastics.

SUMMARY OF THE INVENTION

It is an object of the present invention to provide an improved fluid filter, particularly a filter for purging fuel or oil.

It is another object of this invention to provide a simple, fluid-tight glueing of the housing portions of plastics to each other and to the filter element.

These and other objects of the invention are attained by a filter for filtering fluids, particularly fuels and oils, comprising a housing including two housing portions; a filter element accommodated in the housing, and glue-accommodating means separating a contaminated side in said housing from a clean side and receiving glue for connecting said two housing portions to each other and to said filter element, said housing portions being both formed of plastics, said glue receiving means being ring-shaped, one of said housing portions having at an inner side thereof in the region of said glue-receiving means an extension which forms an annular pocket which is open to the other of said housing portions, the other of said housing portions being formed with a collar conforming to and extending into said pocket and partially filling said pocket, said filter element having a peripheral surface, said collar together with said extension forming an annular gap limited at said peripheral surface, said annular gap forming said glue-receiving means.

In the filter of this invention a single glue location has two tightly formed connections for a filter medium, namely the connection between the contaminated side and the filtered or clean side and the connection between two housing portions. Therefore cold hardenable glue can be used with this glue-accommodating means. The flowing ability, as well as the dosage of the glue used, can be controlled so that an inexpensive and rational manufacture of the filter be possible. If the filter is utilized for purging benzene or diesel fuel the specific shape of the glue-accommodating means significantly reduces the danger that the glue would swell up under the influence of the fuel and thereby stress in the glue connection would be prevented.

Both housing portions in the region of said glue-receiving means may abut against said peripheral surface and limit together with the same said annular gap.

The gap may have at least one axially extending portion which leads to said pocket, and a radially extending portion which leads to said peripheral surface, said axially extending portion merging into said radially extending portion.

Said extension and said collar may each have in the region of said peripheral surface an oblique surface so that said annular gap is enlarged towards said peripheral surface.

One of said housing portions may be a cup-shaped housing and the other of said portions may be a cover.

The filter element may be a wound filter element.

The housing portions may have rims spaced from the glue-receiving means and being welded to each other.

The gap may have another axially extending portion which is in connection with said at least one axially extending portion via said radially extending portion.

The objects of the invention are further attained by a method of manufacturing a fluid filter including a housing having two housing portions, a wound filter element accommodated in the housing and glue-receiving means for receiving glue for connecting the two housing portions to each other and to the filter element, and wherein one of said housing portions has a pocket and another of said housing portions has a collar, the method comprising the steps of inserting the filter element into one of said portions, filling said pocket at least partially with flowable glue, mounting the other of said housing portions on the one of said portions so that said collar is partially inserted into said pocket and displaces the glue therefrom whereby an annular gap is formed between said housing portion in which the glue is received so that, after solidifying of the glue, said two portions and said filter element are rigidly and tightly connected to each other.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
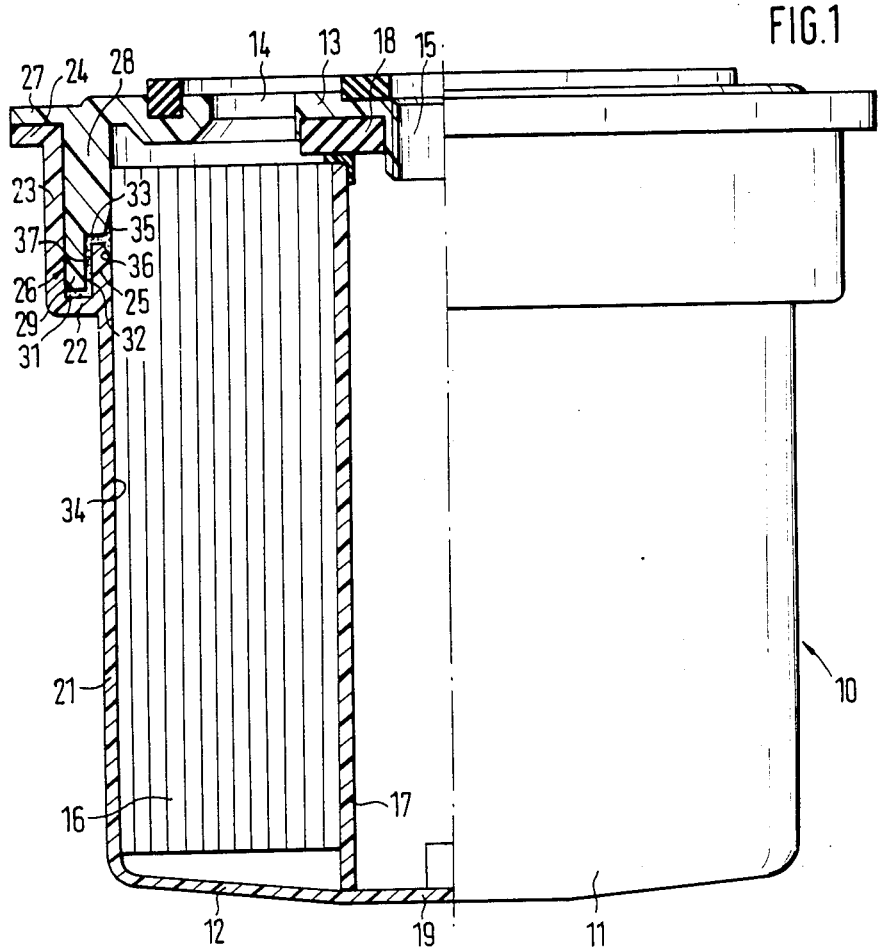
FIG. 1 is a side view, partially in section, of the filter according to the invention.

Referring now to the drawings in detail, and firstly to FIG. 1 thereof, reference numeral 10 designates a fuel filter which has a housing 11 comprised of a cup-shaped housing portion 2 and a housing cover 13 which closes the portion 12. Both portions of housing 11 are made of plastics.

A plurality of feeding openings 14 are annularly distributed in the housing cover 13 whereas a single discharge opening 15 provided with a thread is centrally positioned in the cover. A filter element 16 interconnected between the feeding openings 14 and the discharge opening 15 is accommodated in the housing 11.

Filter element 16 is formed as a conventional wound filter element. The filter element 16 has a central tube 17 which is supported via a flat seal ring 18 against the housing cover 13 at the one end and against a bottom 19 of the housing portion 12 at the other end.

The main housing portion 12 has a first cylindrical section 21 upwardly extending from the bottom 19, which section merges via a ledge 22 into a second enlarged cylindrical section 23 which in turn merges into a radially extended edge or rim 24. The first cylindrical section 21 has an extension or collar 25 which projects beyond ledge 22 and is ring-shaped. Collar or extension 25 forms together with ledge 22 and the second cylindrical section 23 a pocket 26 which is also ring-shaped. The height of pocket 26 is selected so that it determines at least a double wall thickness of the housing portion 12.

The housing cover 13 is set on the housing portion 12 so that an outer peripheral rim 27 of the cover comes into contact with the edge 24 of the housing portion 12. The housing cover further has an axially protruding annular collar 28, by means of which the cover 13 is aligned in the cylindrical section 23 of housing portion 12. Collar 28 has a ring-shaped, strip-like projection 29 which extends into the pocket 26 and forms therein a circular gap 31 of substantially Z-shape cross-section. This circular gap 31 has an axially projecting portion 32 concentrical with the axis of elongation of filter 10 and a radially projecting portion 33 which leads to a peripheral surface 34 of the filter element 16. Respective oblique surfaces 35 and 36 are provided on the collar 28 and extension 25 so that the radially extending portion 33 of the ring-shaped gap 31 is enlarged towards the filter element 16 to form a conical portion. The inner diameter of collar 28 is manufactured precisely so as to correspond to the inner diameter of the portion 21 of housing 12 so that the peripheral surface 34 of filter element 16 would abut in assembly against both housing portions 12 and 13.

The ring-shaped gap 31 which is limited by both housing portions 12 and 13 and by the filter element 16 is filled with glue. Thereby a cold hardenable adhesive or glue is utilized herein, which after solifying will sealingly and rigidly connect both housing portions 12, 13, and also the filter element, 16 to each other.

For the assembling of filter 10, made of plastics, the filter element 16 is slidably inserted into the first cylindrical portion 21 of housing 12. Then a cold hardenable adhesive 37 is placed into pocket 26 which is open from above. The flow of the adhesive or glue and its dosing can be easily controlled. Then the cover 13 is inserted into the main housing portion 12 and pressed against the latter until edges 24 and 27 abut against each other. Upon pressing of the housing cover 13 the ring-shaped projection 29 of collar 28 extends into the pocket 31 and dislodge the glue in the ring-shaped gap 31 whereby the glue will flow in the inward direction towards the filter element 16. The solidified glue within the gap 31 forms a rigid and tight anchoring of the both housing portions 12, 13 and the wound filter element 16. Due to a specific chamber or recess for the accommodation of the glue in the gap 31 aggressive fuel to be filtered can affect the glue 37 only to a limited degree so that swellings and inner stresses connected therewith would be avoided in the glue connection.

In order to enhance resistance to pressure both edges 24 and 27 of the housing portions 12 and 13 made of plastics can be welded to each other.

The illustrated filter 10 provides that in the housing 11 formed of synthetic plastic material a glue-accommodating gap between the housing portions 12, 13 and the filter element 16 can be produced in a very simple and rational manner. Thus the glue accommodating spot would satisfy requirements to the plastic filter in operation.

Figure 2:
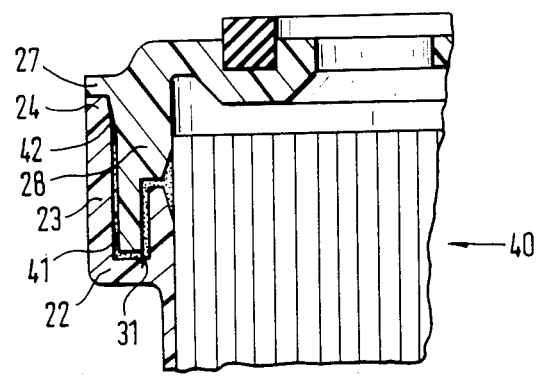
FIG. 2 is a partial sectional view through the filter in accordance with a modified embodiment of the invention.

FIG. 2 illustrates another embodiment of this invention Reference numeral 40 denotes the filter in toto. The like reference numerals for identifying structural components similar to those of FIG. 1 will be utilized for the description of the embodiment of FIG. 2. Filter 40 differs from the filter of FIG. 1 in that the Z-shaped annular gap 31 is formed, having a second axial portion 41. The ring-shaped, axially extending portion 41 projects from the radial portion formed at the step or ledge 23 beyond the pocket 26 upwardly and up to a conical surface 42 which serves the purpose of centering the cover 13 in the housing portion 12. Both housing portions 12, 13 are rigidly connected to each other by the glue solidified in the gap 31 also extended at the second cylindrical portion 41 so that an additional welding of edges 24 and 27 to each other can be omitted. Edges 24, 27 therefore would have only a centering function.

It is of course understood that the invention is not limited to these two embodiments. For example, the shapes of pocket 26 and collar 28 can be modified taking into consideration, however that glue must be radially concentrated on the wound filter element 16. Instead of requiring the flowing of the fluid being filtered through the filter 10 a different type of the filter can be used. Although the wound filter element is particularly advantageous for this type of the filter other filter elements can be employed, which would permit the chamber-like gap for accommodating the glue.

It will be understood that each of the elements described above, or two or more together, may also find a useful application in other types of fluid refining filters differing from the types described above.

While the invention has been illustrated and described as embodied in a filter for purging fluids, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A filter for filtering fuels, comprising a cup-shaped housing; a cover closing said housing; a wound filter element accomodated in said housing; and glue-receiving means separating a contaminated side in said housing from a clean side and receiving glue for connecting said housing and said cover to each other and to said filter element, said housing and said cover being both formed of plastics, said glue-receiving means being ring-shaped, said housing having, at an inner side thereof, in the region of said glue-receiving means an extension which forms an annular pocket which is open to said cover, said cover being formed with a collar conforming to and extending into said pocket and partially filling said pocket, said filter element having a peripheral surface, said collar together with said extension forming an annular gap limited at said peripheral surface, said annular gap forming said glue-receiving means; said housing and said cover in the region of said glue-receiving means abutting against said peripheral surface and limiting together with the same said annular gap, said gap having at least one axially extending portion in said pocket and a radially extending portion which leads to said peripheral surface, said axially extending portion merging into said radially extending portion so that said housing, said cover, said filter element and said annular gap when filled with glue form an entire sealed assembly in the region of said glue-receiving means.

2. The filter as defined in claim 1, wherein said extension and said collar each has in the region of said peripheral surface an oblique surface so that said annular gap is enlarged towards said peripheral surface.

3. The filter as defined in claim 2, wherein said gap has another axially extending portion which is in connection with said at least one axially extending portion via said radially extending portion.

4. The filter as defined in claim 1, wherein said housing and said cover have rims spaced from said glue-receiving means and being welded to each other.

5. A method of manufacturing a fuel filter including a plastic housing having a cover, a wound filter element accommodated in the housing and glue-receiving means for receiving means for receiving glue for connecting the housing and the cover to each other and to the filter element, and wherein one of said housing and the cover has a pocket and another of said housing and the cover has a collar, the method comprising the steps of inserting the wound filter element into one of said housing and the cover, filling said pocket at least partially with flowable glue, mounting the other of said housing and the cover on the one of said housing and the cover so that said collar is partially inserted into said pocket and displaces the glue therefrom whereby an annular gap is formed betweeen said housing and said cover, in which the glue is received so that after solidifying of the glue, said housing and the cover and said filter element are rigidly and tightly connected to each other and form together with said annular gap when filled with glue an entire sealed assembly in the region of said glue-receiving means.

* * * * *